(12) United States Patent
Son et al.

(10) Patent No.: US 7,893,571 B2
(45) Date of Patent: Feb. 22, 2011

(54) STEPPING MOTOR BEING CONVENIENTLY ASSEMBLED

(75) Inventors: Young Kyu Son, Gwangjoo-si (KR); Eung Mo Yang, Gwangjoo-si (KR)

(73) Assignee: LG Innotek Co., Ltd, Seoul (KR)

( * ) Notice: Subject to any disclaimer, the term of this patent is extended or adjusted under 35 U.S.C. 154(b) by 594 days.

(21) Appl. No.: 10/553,975

(22) PCT Filed: Dec. 9, 2004

(86) PCT No.: PCT/KR2004/003225
§ 371 (c)(1),
(2), (4) Date: Oct. 19, 2005

(87) PCT Pub. No.: WO2005/057761
PCT Pub. Date: Jun. 23, 2005

(65) Prior Publication Data
US 2006/0220482 A1    Oct. 5, 2006

(30) Foreign Application Priority Data
Dec. 9, 2003   (KR) .................. 10-2003-0088878

(51) Int. Cl.
*H02K 37/00* (2006.01)
*G04C 13/11* (2006.01)
(52) U.S. Cl. ................. 310/49.19; 310/49.01
(58) Field of Classification Search ............... 310/49 R, 310/49.19, 49.01
See application file for complete search history.

(56) References Cited

U.S. PATENT DOCUMENTS

| 4,381,747 | A |   | 5/1983  | Kobayashi et al. |
|-----------|---|---|---------|------------------|
| 4,528,473 | A |   | 7/1985  | Tezuka           |
| 4,806,025 | A | * | 2/1989  | Kamiyama et al. .......... 384/202 |
| 4,878,455 | A |   | 11/1989 | van der Veer     |
| 4,942,325 | A | * | 7/1990  | Fukaya ....................... 310/257 |
| 5,073,735 | A |   | 12/1991 | Takagi           |

(Continued)

FOREIGN PATENT DOCUMENTS

DE    19843226  A1  *  3/2000

(Continued)

OTHER PUBLICATIONS

Kang et al. "Press Sheet Metal Working", Jungmumkag Public Company, Chapter 3 (Feb. 10, 1994).

(Continued)

*Primary Examiner*—Quyen Leung
*Assistant Examiner*—Alex W Mok
(74) *Attorney, Agent, or Firm*—Birch, Stewart, Kolasch & Birch, LLP

(57) ABSTRACT

A stepping motor includes a bracket, a housing having a first end coupled to the bracket and a second end having a reduced width compared with the first end, a stator disposed in the housing to form electric field, a first supporting unit formed on a first end of the bracket, a magnet fixed corresponding to the stator to provide the electric field, a second supporting unit supported on the second end of the housing, a rotor supported by the first and second supporting units, and a stopper fitted on an opened end of the second end of the housing to support the second supporting unit.

24 Claims, 2 Drawing Sheets

U.S. PATENT DOCUMENTS

| | | | |
|---|---|---|---|
| 5,113,107 A * | 5/1992 | Atsumi et al. | 310/256 |
| 5,486,054 A * | 1/1996 | Nagata et al. | 384/610 |
| 5,747,897 A | 5/1998 | Iwasa et al. | |
| 5,811,903 A * | 9/1998 | Ueno et al. | 310/90 |
| 5,845,390 A | 12/1998 | Cheng | |
| 6,157,103 A | 12/2000 | Ohta et al. | |
| 6,166,889 A | 12/2000 | Aoki | |
| 6,208,046 B1 | 3/2001 | Lee | |
| 6,255,749 B1 * | 7/2001 | Aoshima et al. | 310/49 R |
| 6,541,886 B2 * | 4/2003 | Mayumi | 310/91 |
| 6,608,416 B2 | 8/2003 | Nishimura | |
| 2002/0024265 A1 | 2/2002 | Mayumi | |
| 2003/0228079 A1 | 12/2003 | Mutai et al. | |

FOREIGN PATENT DOCUMENTS

| | | | |
|---|---|---|---|
| EP | 0272716 A1 | 6/1988 | |
| EP | 0 689 278 A1 | 12/1995 | |
| EP | 0 860 931 A2 | 8/1998 | |
| JP | 61-218342 A | 9/1986 | |
| JP | 61218342 A * | 9/1986 | |
| JP | 62-285657 A | 12/1987 | |
| JP | 01295660 A * | 11/1989 | |
| JP | 06-098523 A | 4/1994 | |
| JP | 07-015939 A | 1/1995 | |
| JP | 07-308051 A | 11/1995 | |
| JP | 08-163856 A | 6/1996 | |
| JP | 09-219946 A | 8/1997 | |
| JP | 10-320936 A | 12/1998 | |
| JP | 11-308845 A | 11/1999 | |
| JP | 2000-188857 A | 7/2000 | |
| JP | 2002-010560 A | 1/2002 | |
| JP | 2002-374658 A | 12/2002 | |
| JP | 2003-224959 A | 8/2003 | |
| JP | 3517602 B2 | 4/2004 | |
| KR | 10-1997-0055072 A | 7/1997 | |
| KR | 10-2002-0019331 A1 | 3/2002 | |
| KR | 10-2003-0070233 A | 8/2003 | |
| KR | 10-0397224 B1 | 8/2003 | |
| KR | 10-2003-0072033 A | 9/2003 | |
| KR | 10-2003-0085913 A | 11/2003 | |
| KR | 10-2003-0090262 A | 11/2003 | |
| KR | 10-0512342 B1 | 8/2005 | |
| KR | 10-0547702 B1 | 1/2006 | |

OTHER PUBLICATIONS

Kim et al., "Press Die Design - Manufacturing Method (Advanced Level)", Dae-gwang Publishing Company, Chapter 10 (Aug. 20, 1994).

Park et al., "Pressing Data Book", Gijeon Publishing Company, Chapter 1 (Apr. 30, 1998).

* cited by examiner

STEPPING MOTOR BEING CONVENIENTLY ASSEMBLED

TECHNICAL FIELD

The present invention relates to a stepping motor, and more particularly, to a stepping motor and method for making the same, in which the assembling of the stepping motor can be easily conveniently performed. The present invention further relates to a stepping motor and method for making the same, in which the stepping motor is designed in a simple structure and the number of parts is reduced, thereby making it convenient to assemble the stepping motor and reducing the number of connecting portions to improve the precision of the stepping motor.

BACKGROUND ART

A stepping motor has been applied to a variety of fields such as a floppy disk driver, a printer, a servomechanism, and the like. The stepping motor includes a shaft, a lead screw formed on a first end of the shaft, a magnet fixed on a second end of the shaft, and a stator applying electric field around the magnet. The shaft functions as a rotor cooperating with the stator. A transfer member is engaged with the lead screw. Accordingly, when the lead screw rotates, the transfer member reciprocates.

The operation of the stepping motor will be described hereinafter briefly. The shaft rotates by electromagnetic force generated between the magnet and the stator. When the shaft rotates, the lead screw rotates together with the shaft. At this point, the transfer member coupled to the lead screw moves in a direction of axis thereof.

Formed on opposite ends of the shaft are bearings supporting the shaft and preventing the shaft from being removed. The bearing has a complicated structure composed of balls, springs and guides.

In an assembling process of the stepping motor, the above-described parts are connected to each other. Therefore, after the assembling process is finished, there may be interference between the parts adjacent to the shaft, thereby deteriorating the rotational performance of the motor and reducing the service life of the motor.

Furthermore, the connection processes between the many parts makes it complicate to assemble the stepping motor, thereby deteriorating the working efficiency.

DISCLOSURE

Technical Problem

Accordingly, the present invention is directed to a stepping motor and method for making the same that substantially obviates one or more of the problems due to limitations and disadvantages of the related art.

An object of the present invention is to provide a stepping motor and method for making the same, which can simplify the assembling process by improving a supporting structure of a bearing and reducing the number of parts.

Another object of the present invention is to provide a stepping motor and method for making the same, which can improve the operational reliability by simplifying a shaft supporting structure to increase the assembling precision between the parts and improving the coaxiality of the stepping motor.

Technical Solution

To achieve these and other advantages and in accordance with the purpose of the present invention, as embodied and broadly described, there is provided a According to another aspect of the present invention, there is provided a stepping motor comprising: a bracket; a housing having a first end coupled to the bracket and a second end having a reduced width compared with the first end; a stator disposed in the housing to form electric field; a first supporting unit formed on a first end of the bracket; a magnet fixed corresponding to the stator to provide the magnetic field; a second supporting unit supported on the second end of the housing; a rotor supported by the first and second supporting units; and a stopper fitted on an opened end of the second end of the housing to support the second supporting unit.

According to another aspect of the present invention, there is provided a stepping motor comprising: a housing provided with a guide portion for guiding a second supporting unit; a stator installed in the housing to form electric field; a rotor rotatably supported by the second supporting unit and inserted to be spaced away from the stator; a magnet fixed on the rotor to correspond to the stator; and a bracket having a third supporting unit in which a first side of the rotor is inserted, contacting an opening portion of the housing and a first supporting unit on which a second side of the rotor is rotatably supported.

According to still another aspect of the present invention, there is provided a method for making a stepping motor, comprising the steps of: aligning a bracket and a single body housing using a pin; coupling the single body housing to the bracket; inserting a rotor in the housing and the bracket; and aligning a supporting unit on an end of the rotor.

Advantageous Effects

According to the present invention, the assembling precision can be improved by simplifying the shaft supporting structure. In addition, by integrally forming a bearing guide function on a housing, the number of parts can be reduced, thereby simplifying the assembling process.

Furthermore, by assembling tooth yokes in an integral housing, the concentric precision between the tooth yokes is improved, thereby improving a drooping phenomenon of a rotor as well as coaxiality and increasing the torque of the motor.

BEST MODE FOR CARRYING OUT THE INVENTION

Hereinafter, preferred embodiments of the present invention will be described in detail with reference to accompanying drawings. While the present invention has been described and illustrated herein with reference to the preferred embodiments thereof, it will be apparent to those skilled in the art that various modifications and variations can be made therein without departing from the spirit and scope of the invention.

Thus, it is intended that the present invention covers the modifications and variations of this invention that come within the scope of the appended claims and their equivalents.

Figure 1:
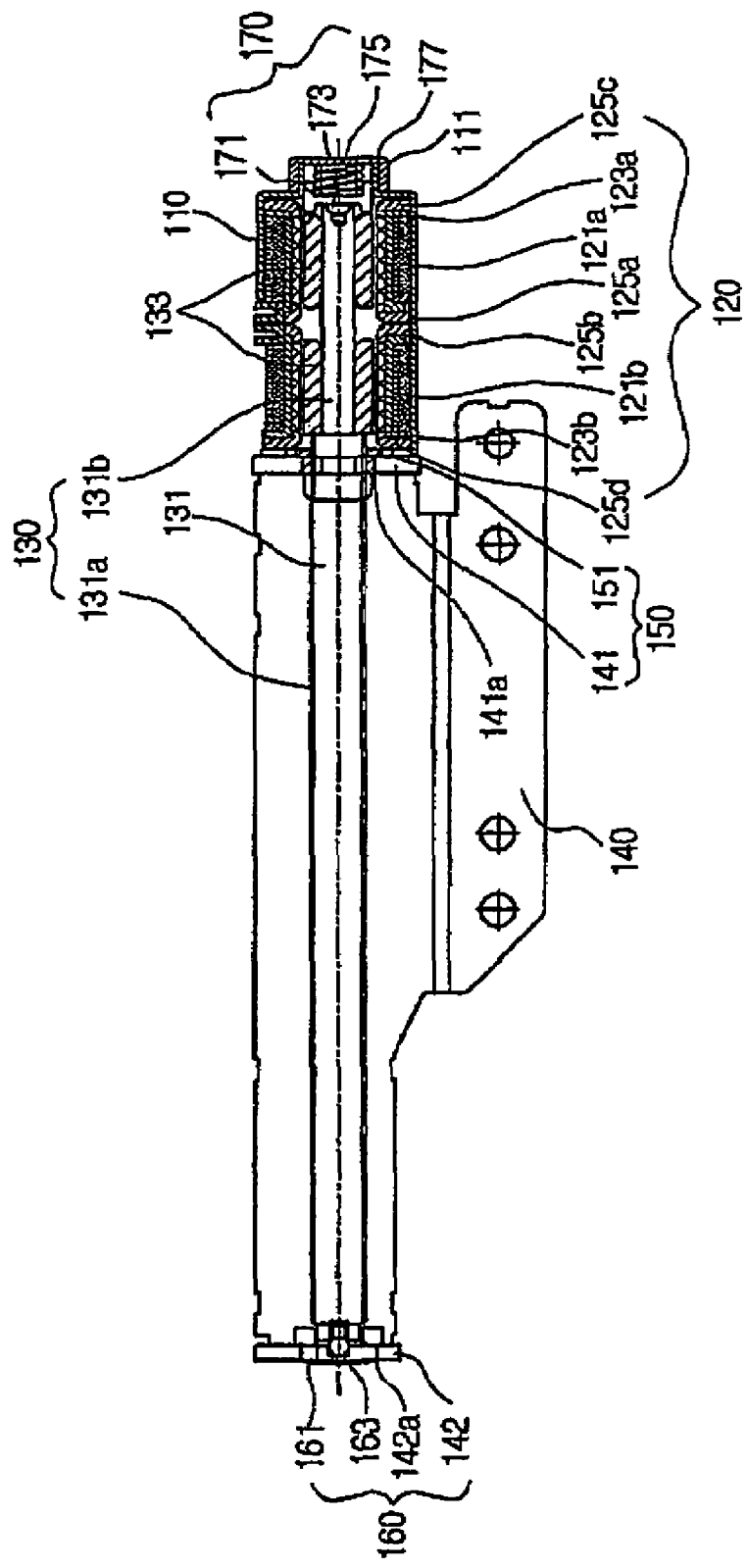
FIG. 1 is a sectional view of a stepping motor according to a preferred embodiment of the present invention.
Figure 2:
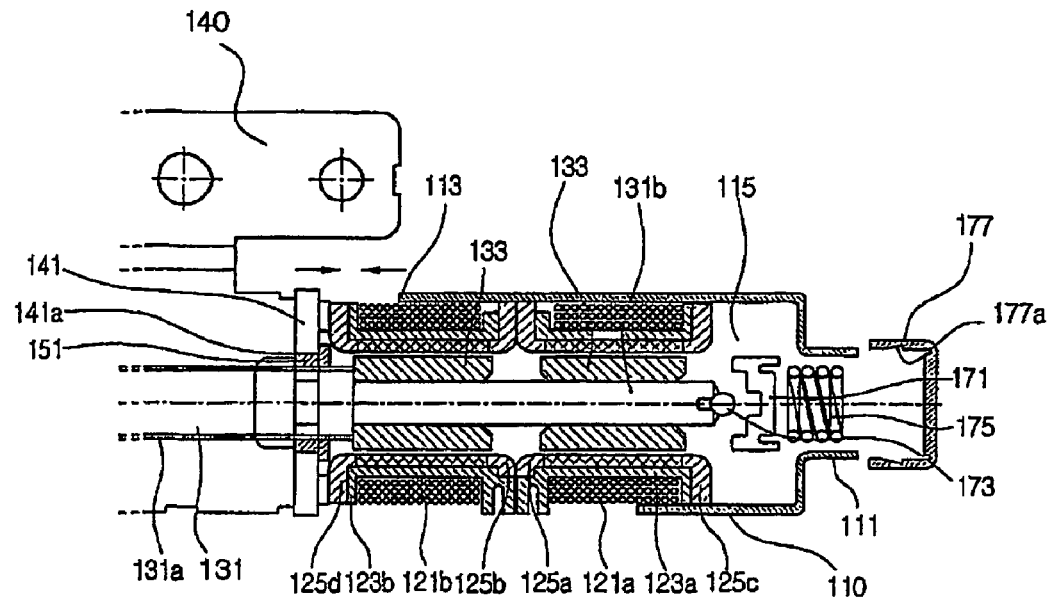
FIG. 2 is an enlarged sectional view of a housing depicted in FIG. 1.

FIG. 1 shows a sectional view of a stepping motor according to a preferred embodiment of the present invention and FIG. 2 shows an enlarged sectional view of a housing depicted in FIG. 1.

Referring to FIGS. 1 and 2, the inventive stepping motor includes a bracket 140, a housing enclosing an outer circumference of a stator 120, a rotor 130, a first supporting unit 160, and a second supporting unit 170. The bracket 140 defines a frame of the stepping motor so that the stepping motor can be installed on an object by the bracket 140. The housing is disposed around the stator 120 to protect a driving unit.

The bracket 140 is provided at a first end with a first hooking part 142 bent in a vertical direction and at a second end with a second hooking part 141 bent in a vertical direction. The first and second hooking parts 142 and 141 are respectively provided with penetrating holes 142a and 141a.

The rotor 130 includes a shaft 131 having a predetermined diameter and length, a lead screw 131a formed on an outer circumference of the shaft 131 to guide a transfer member in a reciprocal direction when the shaft 131 rotates by cooperating with the stator 120, a magnet 133 corresponding to the stator 120, and a magnet fixing end 131b extending from an end of the shaft 131, the magnet 133 being provided on an outer circumference of the magnet fixing end 131b.

The shaft 131 included in a rotor 130, the magnet 133 and the magnet fixing end 131b are integrally rotated. The is stator 120 and the magnet 133 are spaced away from each other by a predetermined distance.

The first supporting unit 160 includes a pivot bearing 161 installed in the penetrating hole 142a of the first hooking part 142 and a ball bearing 163 mounted on a central portion of the penetrating hole 142a.

The second supporting unit 170 includes a ball 173 roll-contacting a right end of the rotor 130, a thrust bearing 171 for axially supporting the ball 173, and a spring 175 elastically supporting the thrust bearing 171 to absorb impact. The rotor 130 is supported at its opposite ends by the first and second supporting units 160 and 170; thereby accurately maintaining a concentric axis.

The stator 120 is provided in the housing 110 to form electric field, including coils 121a and 121b to which electric current is applied, bobbins 123a and 123b around which the coils 121a and 121b are respectively wound, and a plurality of tooth yokes 125a, 125b, 125c, and 125d that are engaged with each other.

As another embodiment of the present invention, a third supporting unit 150 including a supporting member 151 inserted in the second hooking part 141 may be further provided.

By the supporting member 151 inserted in the second hooking part 141, the coaxiality of the rotor 130 is improved, thereby generating high power toque from the stepping motor of the present invention.

The structure of the stepping motor will be described in more detail hereinafter.

The housing 110 defines a hollow portion 115. The housing is provided at a first end with an opening 113 engaging with the second hooking part 141 and at a second end with a guide portion for guiding the thrust bearing 171.

That is, the guide portion of the housing 110 is formed through a deep drawing process. The spring 175, the thrust bearing 171 and the ball 173 are disposed in the guide portion in a rightward order.

That is, the ball 173 roll-contacts the right end of the rotor 130 and the thrust bearing 171 supports the ball 173 in the axial direction. The spring 175 supports the thrust bearing 171 to absorb the impact generated by the rotation of the rotor 130. The thrust bearing 171 is inserted in the inner circumference of the guide portion 111.

A cap-shaped stopper 177 is coupled to the guide portion 111 to prevent the ball 173, the spring 175 and the thrust bearing 171 from being removed out of the guide portion 111.

A pocket 177a is depressed and inclined on the inner circumference of the stopper 177. When the stopper 177 is forcedly fitted or bonded in the guide portion 111, the pocket 177a functions to prevent foreign objects from being introduced into the housing 110.

The spring 175 may be formed of a coil spring and the thrush bearing 171 may be formed of synthetic resin.

As another embodiment, the supporting member 151 may be designed to directly support the rotor 130 by inserting through the penetrating hole 141a of the second hooking part 141.

A method for making the stepping motor will be briefly described hereinafter.

The stator 120 is first mounted in the housing 110. Then, the housing 110 and the bracket 140 are aligned by a pin (not shown).

Next, an extreme end of the opening portion 113 of the housing is coupled to the second hooking part 141 of the bracket 140.

Then, the pin is removed and the rotor is inserted. The ball 173, the thrust bearing 171 and the spring 174 are installed in this order in the guide portion 111 of the housing 110. The stopper 177 is coupled to the end of the guide portion 111 to prevent the ball 173, the thrust bearing 171 and the spring 174 from being removed out of the guide portion 111, thereby finalizing the assembling of the stepping motor.

The assembling process will be described in more detail with reference to the accompanying drawing.

Figure 3:
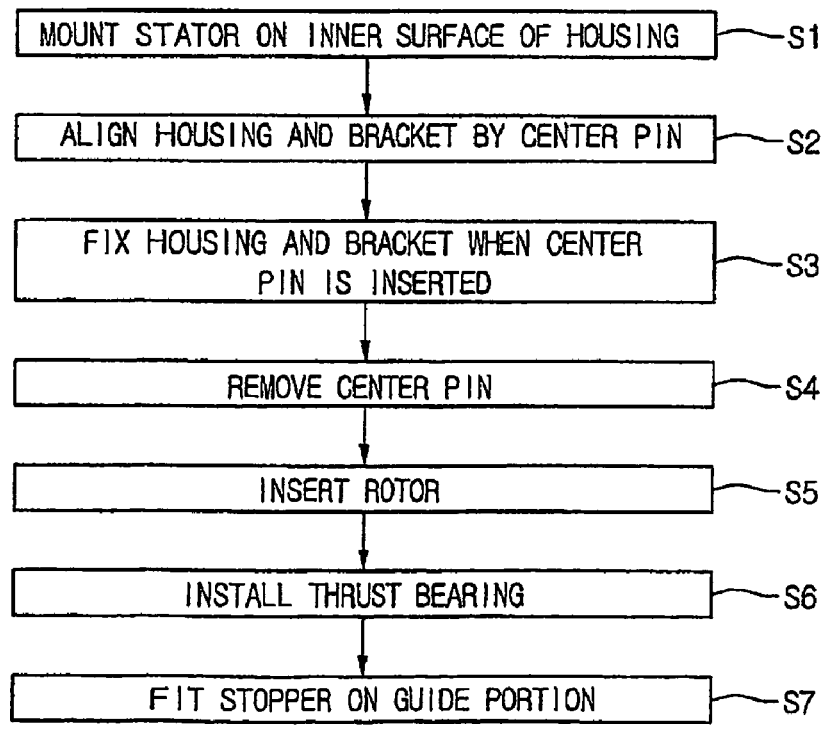
FIG. 3 is a flowchart illustrating a method for making a stepping motor according to an embodiment of the present invention.

FIG. 3 shows a flowchart illustrating the assembling process of the stepping motor according to an embodiment of the present invention.

Referring to FIG. 3, a plurality of parts constituting the stator 120 are mounted on an inner surface of the hollow portion 115 of the housing 110 (S1), and the housing 110 and the bracket 140 are aligned by a center pin (not shown) such that the guide portion 111 of the housing 110 and the penetrating holes 142a and 141a formed on the respective first and second hooking parts 142 and 141 of the bracket 140 are aligned on a concentric axis (S2).

At this point, the penetrating holes 141a and 142a and the guide portion of the housing 110 are designed such that the inner diameters thereof are identical to each other. The center pin is designed such that an outer diameter thereof is identical to the inner diameter. As a result, when the center pin is inserted, the bracket 140 and the housing 110 are accurately aligned on the coaxial direction.

After the above, the end of the opening portion of the housing 110 is coupled to the second hooking part 141 of the bracket 140 by welding or coking process (S3). At this point, since the bracket 140 and the housing 110 are aligned by the center pin, the coaxiality of the bracket 140 and the housing 110 is not deformed.

Next, the center pint is removed (S4) and the rotor 130 is inserted (S5).

Here, in order to assemble the stepping motor according to above-described alternative embodiment, the supporting member 151 may be inserted into the penetrating hole 141a before the rotor 130 is inserted. In this case, the center pin may not be used in order to align the bracket 140 and the housing 110 on a coaxial line.

Meanwhile, the inserted end of the rotor 130 is supported on the first supporting unit 160 by penetrating the second hooking part 141. As a result, when the rotor 130 is completely inserted, the stator 120 maintains a predetermined distance from the magnet fixing end 131b.

After the above, the thrust bearing 171 with the ball 173 and the spring 175 are installed in the guide portion 111 of the housing 110 (S6), and the cap-shaped stopper 177 is fitted on the guide portion 111 to prevent the bearing structure from be removed (S7).

As described above, when the assembling of the stepping motor is finished, the ball 173 contacts the magnet fixing end 131b as well as the thrust bearing 171. By the ball 173 contacting the thrust bearing 171, the rolling motion of the ball 173 becomes possible, thereby realizing the bearing operation. The load applied by the rotor 130 in an axial direction is attenuated by the spring 175, thereby maintaining the ideal coaxiality. Since the insertion end of the rotor 130 is supported by the first supporting unit 160, the overall load generated by the rotor 130 in the axial direction can be fully supported.

According to the present invention, since the housing 110 is formed in a single body, the coaxiality is improved compared when a plurality of housings are formed. Furthermore, since the housing 110 is coupled to the bracket 140 by a single coupling process, the fraction defective caused during the assembling process of the stepping motor can be remarkably reduced.

In addition, by forming the guide portion for guiding the second supporting unit 170 on the housing 110, there is no need of any additional part for supporting the bearing. Furthermore, since the cap-shaped stopper 177 is easily coupled to the opened end of the guide portion 111, the assembling process of the stepping motor becomes more convenient.

MODE FOR CARRYING OUT THE INVENTION

Features of the present invention is in that the housing can be easily fixed on the bracket in a state where the housing is guided by the center pin and that the bearing structure is supported by the housing. It will be apparent to those skilled in the art that various modifications and variations can be made therein without departing from the spirit and scope of the invention.

INDUSTRIAL APPLICABILITY

The present invention has advantages as follows:
1. The assembling precision can be improved by simplifying the shaft supporting structure.
2. By integrally forming a bearing guide function on a housing, the number of parts can be reduced, thereby simplifying the assembling process.
3. By assembling tooth yokes in an integral housing, the concentric precision between the tooth yokes is improved, thereby improving a drooping phenomenon of a rotor as well as coaxiality and increasing the torque of the motor.

The invention claimed is:

1. A stepping motor comprising:
   a bracket including a first supporting unit and a third supporting unit;
   a housing including a first portion coupled to the third supporting unit, a second portion connected to the first portion, and a third portion integrally formed on the second portion;
   a stator including a first stator faced with the first portion of the housing and a second stator faced with the second portion of the housing, wherein the stator is disposed in the housing to form an electric field;
   a magnet faced with the stator and configured to provide a magnetic field;
   a shaft having a lead screw and rotating with the magnet, wherein the shaft is rotatably supported by the first supporting unit;
   a second supporting unit disposed in the third portion of the housing; and
   a stopper coupled to the third portion of the housing and configured to elastically support the shaft together with the second supporting unit and to prevent the second supporting unit from being removed out from the third portion of the housing, wherein an inner surface of the stopper is contacted with an outer surface of the third portion of the housing,
   wherein the stopper is overlapped with the third portion of the housing in a radial direction and the stopper is not overlapped with the first and second portion of the housing in the radial direction.

2. The stepping motor according to claim 1, wherein the second portion of the housing is integrally formed on the first portion of the housing.

3. The stepping motor according to claim 1, wherein the third supporting unit includes a hooking part formed by bending the bracket.

4. The stepping motor according to claim 3, wherein the third supporting unit includes a supporting member coupled to the hooking part.

5. The stepping motor according to claim 1, wherein the magnet includes a first magnet faced with the first stator and a second magnet faced with the second stator, and wherein the first magnet and the second magnet are spaced from each other.

6. The stepping motor according to claim 1, wherein the second supporting unit includes a ball contacting an end of the shaft and a thrust bearing contacting the ball.

7. The stepping motor according to claim 6, wherein the second supporting unit includes a spring contacting the thrust bearing.

8. The stepping motor according to claim 6, wherein the stopper includes an inclined inner surface faced with the outer surface of the third portion of the housing.

9. A stepping motor comprising:
   a bracket including a first supporting unit and a third supporting unit;
   a housing including a first portion coupled to the third supporting unit, a second portion connected to the first portion, and a third portion integrally formed on the second portion, wherein the second portion of the housing have a first section, and wherein the third portion of the housing have a second section smaller than the first section;
   a stator including a first stator faced with the first portion of the housing and a second stator faced with the second portion of the housing, wherein the stator is disposed in the housing to form an electric field;
   a magnet faced with the stator and configured to provide a magnetic field;
   a shaft having a lead screw and rotating with the magnet, wherein the shaft is rotatably supported by the first supporting unit;
   a second supporting unit disposed in the third portion of the housing; and a stopper coupled to the third portion of the housing and configured to support the shaft together with the second supporting unit and to prevent the second supporting unit from being removed out from the third portion of the housing, wherein the stopper is overlapped with the third portion of the housing in a radial direction and the stopper is not overlapped with the first and second portion of the housing in the radial direction, and wherein the second supporting unit, the third portion of the housing, and the stopper are overlapped in a plane perpendicular to an axis direction of the shaft.

10. The stepping motor according to claim 9, wherein the second portion of the housing is integrally formed on the first portion of the housing.

11. The stepping motor according to claim 9, wherein the third supporting unit includes a hooking part formed by bending the bracket.

12. The stepping motor according to claim 11, wherein the third supporting unit includes a supporting member coupled to the hooking part.

13. The stepping motor according to claim 9, wherein the magnet includes a first magnet faced with the first stator and a second magnet faced with the second stator, and wherein the first magnet and the second magnet are spaced from each other.

14. The stepping motor according to claim 9, wherein the second supporting unit includes a ball contacting an end of the shaft and a thrust bearing contacting the ball.

15. The stepping motor according to claim 14, wherein the second supporting unit includes a spring contacting the thrust bearing.

16. The stepping motor according to claim 9, wherein the stopper includes an inclined inner surface faced with the outer surface of the third portion of the housing.

17. A stepping motor comprising:
a bracket including a first supporting unit and a third supporting unit;
a housing including a first portion coupled to the third supporting unit, a second portion connected to the first portion, and a third portion integrally formed on the second portion, wherein the second portion of the housing have a first section, and wherein the third portion of the housing have a second section smaller than the first section;
a stator including a first stator faced with the first portion of the housing and a second stator faced with the second portion of the housing, wherein the stator is disposed in the housing to form an electric field;
a magnet faced with the stator and configured to provide a magnetic field;
a shaft having a lead screw and rotating with the magnet, wherein the shaft is rotatably supported by the first supporting unit;
a second supporting unit disposed in the third portion of the housing; and
a stopper coupled to the third portion of the housing and configured to rotatably support the shaft together with the second supporting unit and to prevent the second supporting unit from being removed out from the third portion of the housing,
wherein the stopper is overlapped with the third portion of the housing in a radial direction and the stopper is not overlapped with the first and second portion of the housing in the radial direction,
wherein the second section of the third portion of the housing is as large as the second supporting unit can be inserted and installed at the third portion of the housing, and
wherein a first portion of the stopper is contacted with a side surface of the third portion of the housing and wherein a second portion of the stopper is contacted with an outer surface of the third portion of the housing.

18. The stepping motor according to claim 17, wherein the second portion of the housing is integrally formed on the first portion of the housing.

19. The stepping motor according to claim 17, wherein the third supporting unit includes a hooking part formed by bending the bracket.

20. The stepping motor according to claim 19, wherein the third supporting unit includes a supporting member coupled to the hooking part.

21. The stepping motor according to claim 17, wherein the magnet includes a first magnet faced with the first stator and a second magnet faced with the second stator, and wherein the first magnet and the second magnet are spaced from each other.

22. The stepping motor according to claim 17, wherein the second supporting unit includes a ball contacting an end of the shaft and a thrust bearing contacting the ball.

23. The stepping motor according to claim 22, wherein the second supporting unit includes a spring contacting the thrust bearing.

24. The stepping motor according to claim 17, wherein the stopper includes an inclined inner surface faced with the outer surface of the third portion of the housing.

* * * * *